United States Patent
Ollila et al.

(10) Patent No.: US 12,462,414 B2
(45) Date of Patent: Nov. 4, 2025

(54) DEPTH SENSING FOR EXTENDED REALITY (XR) APPARATUS

(71) Applicant: Varjo Technologies Oy, Helsinki (FI)

(72) Inventors: Mikko Ollila, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 80 days.

(21) Appl. No.: 18/540,951

(22) Filed: Dec. 15, 2023

(65) Prior Publication Data

US 2025/0200776 A1    Jun. 19, 2025

(51) Int. Cl.
| | |
|---|---|
| G06T 7/593 | (2017.01) |
| G06T 7/521 | (2017.01) |
| H04N 13/239 | (2018.01) |
| H04N 13/254 | (2018.01) |
| H04N 13/271 | (2018.01) |
| H04N 25/47 | (2023.01) |
| H04N 13/00 | (2018.01) |

(52) U.S. Cl.
CPC .............. *G06T 7/593* (2017.01); *G06T 7/521* (2017.01); *H04N 13/239* (2018.05); *H04N 13/254* (2018.05); *H04N 13/271* (2018.05); *H04N 25/47* (2023.01); *G06T 2207/10012* (2013.01); *G06T 2207/10028* (2013.01); *H04N 2013/0081* (2013.01)

(58) Field of Classification Search
CPC .............................. G06T 7/593; H04N 13/254
USPC ........................................................... 348/47
See application file for complete search history.

(56) References Cited

U.S. PATENT DOCUMENTS

| | | | |
|---|---|---|---|
| 2018/0005398 A1* | 1/2018 | Kim | .................. G06T 7/514 |
| 2019/0004262 A1* | 1/2019 | Wigley | ................ G02B 6/0006 |

* cited by examiner

*Primary Examiner* — Amir Shahnami
(74) *Attorney, Agent, or Firm* — ZIEGLER IP LAW GROUP, LLC.

(57) ABSTRACT

Disclosed is an apparatus and a method for depth sensing that includes a scanning light source configured to sequentially illuminate an environment utilizing a scan pattern. The apparatus also includes a birefringent layer adapted to receive and split reflected scan pattern from the environment into an ordinary ray (O-ray) image and an extraordinary ray (E-ray) image. The apparatus further includes an imaging sensor positioned along an optical path of the birefringent layer to capture the O-ray image and the E-ray image as transmitted therefrom. The apparatus further includes a processor configured to compute differences between positions of the O-ray image and the E-ray image and derive a depth map of the environment based on the computed differences.

13 Claims, 4 Drawing Sheets

DEPTH SENSING FOR EXTENDED REALITY (XR) APPARATUS

TECHNICAL FIELD

The present disclosure relates to an apparatus for depth sensing. Moreover, the present disclosure relates to a method for depth sensing.

BACKGROUND

Depth sensing technology, particularly in extended reality (XR) headsets, has become increasingly important. Its applications span across various domains, including tracking headset poses, hands, controllers, dynamic objects, 3D mapping, and facilitating mixed reality occlusions between real and virtual objects. Traditionally, this functionality relied heavily on indirect Time-of-Flight (iToF) cameras. iToF technology captures depth information by measuring the time it takes for a light signal to travel to an object and back to the sensor. This method has been utilized in providing real-time depth data in XR applications.

However, the iToF cameras come with significant limitations. The most pertinent issue is their high power consumption, driven by the need for high laser power and extensive CPU processing resources. This aspect is increasingly problematic as XR headsets move towards wireless designs where battery efficiency is an important factor. Another concern is the limited frame rate capability of iToF cameras, which restricts the responsiveness and fluidity in dynamic environments. Additionally, there are safety issues related to eye exposure to laser emissions, which are of particular concern in consumer products.

In response to these limitations, the industry has seen the emergence of event cameras as an alternative. Event cameras are a type of image sensor that react to changes in illumination rather than continuously measuring illumination levels. This technology offers lower power consumption and can handle processing with smaller CPUs or MCUs. However, the event cameras also have drawbacks. The resolution and update frequency are typically lower than desirable, and their data can be sparse due to the laser scanning path's nature, which limits their effectiveness in accurately rendering complex scenes.

Therefore, in the light of the foregoing discussion, there exists a need to overcome the aforementioned drawbacks.

SUMMARY

The aim of the present disclosure is to provide an apparatus and a method to combine the benefits of both iToF and event cameras while mitigating their respective drawbacks, by offering high-resolution imaging at increased frame rates, operating with low power consumption, and ensuring user safety, particularly concerning eye exposure. The aim of the present disclosure is achieved by an apparatus and a method for depth sensing, as defined in the appended independent claims, which provide depth map derivation from differences in O-ray and E-ray images, offering technical advancements in resolution, frame rate, power efficiency, and safety compared to existing depth sensing methods. Advantageous features and additional implementations are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an apparatus for depth sensing, the apparatus comprising:
- a scanning light source configured to sequentially illuminate an environment utilizing a scan pattern;
- a birefringent layer adapted to receive and split reflected scan pattern from the environment into an ordinary ray (O-ray) image and an extraordinary ray (E-ray) image;
- an imaging sensor positioned along an optical path of the birefringent layer to capture the O-ray image and the E-ray image as transmitted therefrom; and
- a processor configured to compute differences between positions of the O-ray image and the E-ray image and derive a depth map of the environment based on the computed difference.

In a second aspect, the present disclosure provides a method for depth sensing, the method comprising:
- sequentially illuminating an environment using a scanning light source utilizing a scan pattern;
- receiving and splitting reflected scan pattern from the environment into an ordinary ray (O-ray) image and an extraordinary ray (E-ray) image using a birefringent layer;

capturing the O-ray image and the E-ray image along an optical path of the birefringent layer using an imaging sensor; and computing differences between positions of the O-ray image and the E-ray image and deriving a depth map of the environment based on the computed differences.

The present disclosure provides the aforementioned apparatus and the method for depth sensing. The scanning light source, by sequentially illuminating the environment with the scan pattern, ensures a controlled and efficient capture of depth-related information. The birefringent layer is positioned to split this scan pattern into O-ray and E-ray images, effectively creating two distinct data sets from a single light source. The imaging sensor captures these differentiated images. Finally, the processor is configured to compute the positional differences between these images and derive a depth map based on the data provided by the birefringent layer. This synergistic operation results in achieving depth sensing in a power-efficient manner while also generating high-resolution depth maps, overcoming the limitations of traditional depth sensing technologies.

The apparatus for depth sensing of the present disclosure may be implemented as an extended reality (XR) device having an arrangement to measure relative distance of objects in an environment. The apparatus is designed to assess and map the contours and distances within a physical space accurately. This capability is important in applications where understanding the layout and dimensions of the surrounding environment is essential, such as in the XR applications, and even autonomous navigation systems, and complex imaging tasks. The apparatus achieves this through a coordinated interplay of light projection and advanced image processing, enabling more precise, efficient, and versatile depth analysis, for both consumer and industrial applications.

The scanning light source, in the apparatus, is configured to sequentially illuminate the environment using the scan pattern, which may be in form of a focused line (or curve) of light that scans across the area of interest.

In an example, the scanning light source continuously scans throughout the field of view in a Lissajous pattern. This sequential illumination is utilized to accurately capture spatial data. By moving the scan pattern across the environment, the apparatus can gather comprehensive depth information over time, rather than relying on a single, static illumination point. Specifically, the use of the birefringent layer, as described in the present disclosure, leads to the separation of incoming light into ordinary rays (o-ray) and extraordinary rays (e-ray). The sequential illumination aligns with the need to distinguish and calculate disparities in positions of the scanning light source and reference dots for both o-ray and e-ray. Also, the sequential illumination of the scene allows for precise control over the timing and order of light exposure to different areas within the field of view. Further, by sequentially illuminating discrete regions, the apparatus minimizes interference between adjacent illuminated areas. In present examples, the scan pattern may have a path of predetermined function. In some examples, the scan pattern may be generated by freely oscillating MEMS mirror or controller, as may be contemplated by a person skilled in the art.

In an embodiment, the scanning light source comprises a Vertical-Cavity Surface-Emitting Laser (VCSEL) projector having a laser dot scanner configured for the sequential illumination of the environment by moving a laser dot across the environment, to generate the scan pattern in form of a line or a curve. VCSELs are known for their ability to produce focused, directed beams of light, as required for scanning applications. The movement of the laser dot across the environment is controlled, forming a pattern that could be a straight line or a curve, depending on the topography and dimensional requirements of the area being scanned. In general, the scan pattern may be any narrow structured light slice. Herein, the narrowness of the slice determines the resolution of its direction, e.g., a 2-4 pixel wide checkerboard pattern. In such case, the E-ray image may look for where that checkerboard is formed and how distorted it is (as discussed later in more detail). This configuration of the scanning light source to project the scan pattern allows for systematic illumination for creating accurate depth maps. Herein, the laser dot scanner moves a focused laser dot across the environment systematically. This movement enables the apparatus to cover the entire area of interest in a controlled manner. The use of a VCSEL projector offers benefits such as high precision in the laser beam's direction, potentially improved depth measurement accuracy, and efficiency in power consumption, making it particularly suitable for detailed and energy-efficient depth sensing operations.

In an embodiment, the scanning light source is configured to adjust one or more of width, size, aspect ratio, shape of the laser dot. This adjustability allows the apparatus to adapt to various environmental conditions and object characteristics. For example, a wider laser dot can cover more area, beneficial for quick scanning in less detailed environments, while a narrower dot provides higher precision, as may be required for detailed depth mapping. Similarly, adjusting the aspect ratio and shape of the laser dot enables customized scanning patterns, enhancing the depth data quality for different applications and scenarios. By adjusting any one or more of the said factors, for example the width of the scanning dot, the present apparatus gains the ability to perceive depth disparities over a broader range, and this wider range of width variations allows to capture depth information from objects located at varying distances.

More specifically, the ability to adjust the width and size of the laser dot is helpful in scenarios where a broad overview of the area is sufficient. In this scenario, a larger dot can be used to cover more surface area per scan, enhancing the scanning efficiency. This is particularly useful in less complex environments where high detail may not be required. On the other hand, in situations demanding high precision, such as in densely populated or intricately detailed spaces, a smaller dot size ensures that finer details are captured accurately. Similarly, adjusting the aspect ratio and shape of the laser dot further refines the scanning process. Different aspect ratios can be beneficial for scanning environments with varying geometries. For instance, a more elongated dot may be more effective in scanning narrow, elongated spaces, while a more equidimensional shape may be better suited for more open areas.

Further in the present apparatus for depth sensing, the birefringent layer is configured for receiving and splitting the reflected scan pattern from the environment into two distinct images: the ordinary ray (O-ray) image and the extraordinary ray (E-ray) image. The birefringent layer is strategically positioned within the optical path to intercept the reflected scan pattern emanating from the illuminated scene. The birefringent layer acts as an interface between the scene and the depth sensing system, ensuring that the incoming light information is efficiently captured. The birefringent layer possesses the unique property of double refraction, a phenomenon inherent to anisotropic, transmissive materials. When the scan pattern encounters the birefringent layer, it undergoes double refraction, resulting in the formation of two separate rays, i.e., the O-ray and the E-ray. These rays follow distinct optical paths within the birefringent material.

It may be understood that, herein, the O-ray represents one of the split components and is captured as an image. This image contains information about the portion of the reflected scan pattern that corresponds to the O-ray. It contributes to the depth sensing process by providing data related to the O-ray's interaction with the scene, including its position, intensity, and any disparities caused by depth variations. Similarly, the E-ray, the other split component, is captured as a separate image. This image represents the portion of the reflected scan pattern corresponding to the E-ray. It carries information about the E-ray's interaction with the scene, including its position, intensity, and any disparities associated with depth variations.

The O-ray follows the ordinary refraction path, while the E-ray takes an extraordinary path, diverging from the O-ray. This separation is fundamental to the depth sensing process, as it creates two separate paths of light, each carrying unique information about the environment's depth. By analyzing the disparities in positions, intensities, or any other relevant characteristics between these two images, the apparatus can calculate depth information with a high degree of accuracy. It may be noted that depth disparities are inversely proportional to depth. The exploitation of this phenomenon helps the present apparatus, with such optical arrangement, to achieve passive monocular 3D imaging within a small form factor.

Further, the strategic positioning of the imaging sensor along the optical path of the birefringent layer enables for capturing the ordinary ray (O-ray) image and the extraordinary ray (E-ray) image as transmitted from the birefringent layer. Herein, the imaging sensor may be configured for high-resolution capture which ensures that the differences in the paths of the O-ray and E-ray are accurately recorded. Further, the imaging sensor may be configured to detect variations in light intensity and color, which are inherent in the split rays. This sensitivity is crucial for differentiating between the O-ray and E-ray images, which may have subtle differences depending on the environment's composition and lighting conditions. It may be appreciated that placement and alignment of the imaging sensor with the birefringent layer is designed to maximize the capture of the split rays while minimizing any optical distortions or aberrations that may affect the depth sensing accuracy.

The processor, in the present apparatus, has the primary function to compute the differences between the positions of the O-ray image and the E-ray image captured by the imaging sensor. These position differences are the key to understanding the depth variations within the environment. The processor acts as the computational engine that transforms raw pixel-level data into meaningful depth information. To compute the differences in positions between the O-ray and E-ray images, the processor relies on stereo disparity analysis principles. Stereo disparity refers to the apparent shift or displacement of corresponding features in two images captured from slightly different perspectives. In the present context, the O-ray and E-ray images represent these two perspectives. By identifying corresponding features in these images and measuring their positional differences, the processor can infer the depth of objects or elements within the scene.

In particular, herein, the depth calculation process is the identification and matching of features in the O-ray and E-ray images. These features could be distinct points, edges, or patterns that appear in both images. The processor employs sophisticated algorithms to perform this feature matching and establish correspondence between the two images. Feature matching is a fundamental aspect of stereo vision, as it forms the basis for measuring disparities and subsequently deriving depth information. Once the processor has successfully matched features in the O-ray and E-ray images, it proceeds to calculate the disparities between corresponding features. These disparities represent the horizontal shift in pixels between the two images and are directly related to the depth of objects within the scene. The greater the disparity, the closer the object is to the imaging sensor. The processor may use this information to create a disparity map, which is essentially a two-dimensional representation of depth disparities across the entire image. From the disparity map, the processor derives a depth map of the environment. The depth map assigns a depth value to each pixel in the image, indicating the distance between the imaging sensor and the corresponding point in the scene.

The depth map provides a comprehensive representation of the 3D structure of the environment. For instance, this depth map forms the foundation for creating immersive XR experiences, enhancing applications in virtual reality, augmented reality, and mixed reality environments. This depth map allows for the visualization of depth information and enables XR applications to create realistic and immersive experiences. In XR applications, real-time or near-real-time depth sensing is often essential for providing seamless and interactive experiences. The processor is designed to perform these depth calculations efficiently and with minimal latency. This enables XR systems to update the depth map in real time as the scene evolves, supporting dynamic interactions and immersive XR environments. The ability of the processor to perform these computations efficiently and in real time contributes to the overall quality and interactivity of XR applications.

In an embodiment, the imaging sensor comprises at least one event camera having a pixel array sensitive to changes in incoming illumination due to the O-ray image and the E-ray image, and wherein the processor is configured to compute the differences between the positions of the O-ray image and the E-ray image across the pixel array in the at least one event camera. As used herein, the event camera is a specialized type of image sensor inherently different from traditional frame-based cameras. Instead of capturing continuous images at a fixed frame rate, an event camera reacts to changes in brightness for each pixel individually. This unique characteristic makes event cameras particularly well-suited for dynamic and fast-changing environments, which are often encountered in XR applications. Further, unlike traditional cameras that capture full frames at regular intervals, the pixel array in the event camera continuously monitors changes in brightness on a per-pixel basis. When there is a significant change in illumination for a particular pixel, the event camera records this change as an event. This event-based sensing approach provides several advantages, including low latency, high temporal resolution, and efficient data capture in scenarios where traditional cameras may struggle to keep up with rapid changes in the scene.

Now, as discussed, the O-ray images and the E-ray images are produced due to the interaction of light, after passing through the birefringent layer, with the environment. The light reflects back with differing polarization states, corresponding to the O-ray and E-ray images. Herein, the pixel array of the event camera, due to its high sensitivity, can detect the differences in these images caused by changes in the environment's depth. The processor is configured to compute the differences between the positions of the O-ray image and the E-ray image as they are captured across the pixel array in the event camera. This computation may also involve an analysis of the light's polarization state as it reflects from various depths of the environment. This process allows for an accurate depth mapping of the environment. It may be appreciated that high responsiveness of the event camera to changes in light intensity makes it particularly suited for this task, as it can capture the minute differences in the O-ray and E-ray images.

In an embodiment, the scanning light source is configured to pre-curve the scan pattern to match a curvature of a lens of the imaging sensor, such that the O-ray image and the E-ray image are comparatively linear, minimizing lens distortion effects. Herein, this term "comparatively linear" signifies that the images are more aligned with a straight path, countering the natural curving tendency induced by lens distortion. The straighter path of these rays facilitates easier and more accurate calculation of depth data, as it reduces the computational complexity needed to correct for lens-induced distortions. This design consideration is particularly important for the E-ray, which tends to curve differently than the O-ray due to the distinct optical properties inherent in the birefringent material. By pre-curving the scan pattern, the apparatus effectively anticipates and compensates for these differences, ensuring that the imaging sensor captures both rays in a more uniform and linear fashion.

Furthermore, this configuration aids in resolving overlapping pixel events, which is a common challenge in depth sensing. As the E-ray shifts along the curvature, it may overlap with other pixels in the imaging sensor. The pre-curved scan pattern approach allows for a better identification of the source of each E-ray event pixel, as it moves predictably along the curvature. This predictability also extends to situations where completely overlapping events occur. In such instances, the apparatus can distinguish these events by detecting increased light intensity, a result of two overlapping E-ray pixels illuminating the same location.

In an embodiment, the processor is further configured to resolve overlapping pixel events, in processing of the E-ray image, by tracing origin of each pixel event corresponding to the E-ray image along a curvature of the lens of the imaging sensor. That is, when pixel events overlap, as may occur when capturing E-ray images, the apparatus involves identifying the source or origin of each E-ray event pixel by systematically traversing along the curvature of the scan pattern. This process allows the apparatus to separate the contributions of individual pixel events, ensuring that the resulting depth information remains accurate and reliable. For example, if the environment is illuminated with a single horizontal (straight) scan pattern, the O-ray image can appear curved due to lens distortions; however, the O-ray will never overlap itself (i.e., it will not fold back over itself, assuming a reasonably normal lens system). On the other hand, the E-ray image is at an offset from the O-ray image based on the optical depth, and as the direction of the offset is dependent on the lens distortion, it is possible that a single E-ray event may be caused by multiple different (depth, O-ray image location) pairs, and then those ambiguities may need to be resolved by finding the set of depths that result in least amount of missing, i.e., O-ray->E-ray location pairs.

In an embodiment, the imaging sensor is adapted to be sensitive to variations in light intensity to distinguish between overlapping pixel events corresponding to E-ray image by detecting an increased light intensity arising from two coinciding E-ray images. That is, in scenarios where pixel events completely overlap, the apparatus is equipped with a specialized mechanism for distinction which is achieved by detecting an increase in light intensity at specific locations where two overlapping E-ray pixels both illuminate the same spot. This increase in light intensity serves as an indicator of complete overlap and enables the apparatus to differentiate such events from others.

These capabilities helps in enhancing depth sensing accuracy, especially in dynamic and complex environments. The ability to resolve overlapping events ensures that depth calculations remain precise even when capturing scenes with intricate optical effects. Moreover, the capacity of the apparatus to distinguish completely overlapping events adds an extra layer of accuracy, further improving the reliability of the depth map. Furthermore, these features allow to provide real-time or near-real-time depth sensing. For instance, the rapid response of the event camera to changes in illumination, coupled with its capacity to handle overlapping pixel events, ensures that depth information is continually updated as the scene evolves. This real-time capability is particularly suited for applications demanding dynamic and interactive depth perception, such as immersive XR experiences.

In an embodiment, the apparatus further comprises a modulating layer positioned between the scanning light source and the birefringent layer, the modulating layer, comprising a liquid crystal (LC) structure and a linear polarizer, being configured to modulate a polarization of the reflected scan pattern to selectively eliminate one of the O-ray image and the E-ray image for transitioning between different operational modes of depth sensing. That is, the apparatus incorporates the modulating layer, positioned strategically between the scanning light source and the birefringent layer, and includes the LC structure and the linear polarizer for modulating the polarization of the reflected scan pattern. It may be understood that the liquid crystals are materials that exhibit unique optical properties, particularly related to polarization. Within the LC structure, the orientation of liquid crystal molecules can be controlled or manipulated by applying an electric field. This manipulation allows for precise control over the polarization of light passing through the LC structure. Further, the linear polarizer is an optical device that selectively transmits light waves with a specific polarization orientation while blocking light waves with other orientations, and thus may be used for controlling the polarization of the reflected scan pattern.

By adjusting the polarization of the reflected scan pattern, the modulating layer effectively toggles between O-ray and E-ray imaging modes. This mode transitioning allows the apparatus to adapt to varying environmental conditions and requirements. For instance, in certain scenarios, one of the ray images may provide more accurate depth information, and the modulating layer may be configured to selectively eliminate the other image. Such polarization-based modulation enhances the precision of depth sensing by ensuring that only the relevant ray image is processed, reducing potential interference from the other ray image, and may thus contribute to the overall accuracy of the depth map generated by the apparatus.

In some embodiments, the at least one event camera comprises a first event camera and a second event camera, and wherein the processor is configured to capture and triangulate the O-ray image and the E-ray image from the birefringent layer using both the first event camera and the second event camera, to achieve stereo depth determination for deriving the depth map of the environment. That is, the apparatus incorporates not just one but at least two event cameras—the first event camera and the second event camera. These event cameras are strategically employed to capture and triangulate the information from the birefringent layer, including both the O-ray image and the E-ray image. The processor is configured to utilize this dual-camera setup to achieve stereo depth determination, a technique that has been immensely utilized in deriving a comprehensive depth map of the environment.

Herein, the first event camera, one of the two event cameras, captures and processes one perspective of the scene, including the O-ray and E-ray images, and contributes to the creation of a depth map based on its viewpoint. Further, the second event camera complements the first event camera by capturing the same scene from a different perspective, again encompassing both the O-ray and E-ray images. This dual perspective is, then, utilized for stereo depth determination. For this purpose, the processor analyses the information gathered by both event cameras and performs triangulation calculations. By comparing the relative positions of corresponding features within the O-ray and E-ray images from each camera, the processor deduces depth information. This approach expands the depth range that the apparatus can perceive, and further enhances the confidence in the depth map. By integrating the data from two distinct perspectives, the apparatus can better resolve depth disparities, even in complex and challenging scenes.

In some examples, the present apparatus may implement stereo matching of light source and camera with two dots. This technique may involve the stereo matching of the light source and the camera, extended by the presence of two distinct dots. This adds valuable depth range information to the depth map. Additionally, this approach may also allow the apparatus to assign a "confidence" value to depth measurements, to understand the reliability of the depth data.

In an embodiment, the processor is further configured to:
control the scanning light source to generate two distinct scan patterns,
discern optical projections corresponding to the O-ray image and the E-ray image based on the two distinct scan patterns, and
analyzing the relative spatial positioning of the optical projections for deriving the depth map of the environment, utilizing stereo matching techniques.

That is, to achieve comprehensive depth perception, the processor controls the scanning light source to emit laser beams that form two separate scan patterns. These scan patterns traverse the environment and interact with objects and surfaces, ultimately capturing data about the scene. Once the scan patterns have interacted with the environment, they return to the imaging sensor after undergoing the birefringent splitting process, resulting in optical projections. These optical projections contain information related to both the O-ray image and the E-ray image. The processor analyze the relative spatial positioning of these optical projections to derive a depth map of the environment. It may be understood that to perform this analysis, the processor relies on stereo matching techniques, a well-established methodology in the field of computer vision and depth sensing. Stereo matching involves comparing corresponding points or features in the optical projections captured by the two distinct scan patterns. By identifying matching features and evaluating their relative disparities, the processor deduces depth information. The depth map, derived by the processor, provides a pixel-wise representation of the scene's depth information. Each pixel in the depth map corresponds to a specific point in the environment, and its value reflects the distance of that point from the imaging sensor.

The present disclosure also relates to the second aspect as described above. Various embodiments and variants disclosed above, with respect to the aforementioned first aspect apply mutatis mutandis to the second aspect.

The method for depth sensing commences by sequentially illuminating the environment. This illumination process is orchestrated by the scanning light source, which employs the scan pattern to project light onto the objects and surfaces within the scene. This step involves emitting laser beams or light pulses in a controlled manner, typically in a sequential fashion. As the emitted light interacts with the objects and surfaces in the environment, it is partially absorbed, reflected, or refracted. The reflected scan pattern, which contains valuable depth-related information, encounters the birefringent layer strategically positioned in the optical path. This birefringent layer introduces an optical phenomenon known as double refraction. Through double refraction, the birefringent layer effectively splits the incoming light into two distinct components: the O-ray and the E-ray, representing two perspectives of the same scene. Each image contains spatial information about the objects and surfaces in the environment, but they are inherently displaced due to the optical properties of the birefringent layer. The imaging sensor, positioned along the optical path of the birefringent layer, captures the O-ray image and the E-ray image as transmitted from the birefringent layer. The disparities between corresponding points in the O-ray and E-ray images are indicative of the varying distances of objects and surfaces within the environment from the imaging sensor. By analyzing these disparities, the method derives the depth map of the environment, which is a comprehensive representation thereof.

In an embodiment, the scanning light source comprises a Vertical-Cavity Surface-Emitting Laser (VCSEL) projector providing a laser dot, and wherein the method comprises: moving the laser dot across the environment for sequential illumination; and adjusting one or more of the width, size, aspect ratio, and shape of the laser dot using the scanning light source.

In an embodiment, the method further comprises pre-curving the scan pattern to match a curvature of a lens of the imaging sensor, such that the O-ray image and the E-ray image are comparatively linear, minimizing lens distortion effects.

In an embodiment, the method further comprises resolving overlapping pixel events in the processing of the E-ray image by tracing origin of each pixel event corresponding to the E-ray image along a curvature of the lens of the imaging sensor.

In an embodiment, the method further comprises distinguishing between overlapping pixel events corresponding to E-ray image by detecting an increased light intensity arising from two coinciding E-ray images using an imaging sensor adapted to be sensitive to variations in light intensity.

The apparatus and the method of the present disclosure, with the scanning light source, the birefringent layer, the imaging sensor, and the processor, offers a technical solution to the challenges of accurate and efficient depth sensing in various applications, including extended reality (XR) environments. The scanning light source sequentially projects the scan pattern to illuminate the environment. The birefringent layer, a material that splits light into two polarized images (ordinary ray and extraordinary ray), processes the reflected scan pattern. The imaging sensor captures these dual images, and the processor analyzes their positional differences to construct a depth map, providing a comprehensive spatial representation of the environment. The use of multiple event cameras, along with the birefringent layer and advanced depth generation techniques, represents a sophisticated approach to depth sensing. The present apparatus and method also leverage stereo depth determination principles to create detailed and context-aware depth maps.

The present apparatus provides several distinct advantages over existing depth sensing technologies, outperforming existing solutions such as iToF (indirect Time-of-Flight) and conventional event cameras across various critical parameters. One distinguishing feature of the present apparatus is its resolution and frequency capabilities. In contrast to iToF, which provides 1.0+ megapixels at 90 Hz, the present apparatus offers resolution limited only by the event sensor's capabilities, coupled with a high frame rate, enabling detailed real-time depth data capture. Energy efficiency is also another key aspect. While iToF demands 3 W of power and conventional event cameras require 250 mW, the present apparatus operates efficiently at 250 mW, reducing power constraints and enhancing feasibility. In terms of processing requirements, the present apparatus aligns with conventional event cameras, relying on small CPU/MCU processing capabilities, in contrast to iToF, which requires a custom ASIC. Range and eye safety are also crucial considerations. The present apparatus matches or exceeds the range potential of conventional event cameras while maintaining a safe operating range, making it user-friendly. Calibration during production is simplified, with minimal calibration required, reducing production time and costs. In challenging lighting conditions, the present apparatus offers a higher dynamic range, immune to sunlight interference. Further in multiuser scenarios, the present apparatus benefits from additional illumination, making it suitable for applications involving multiple users.

DETAILED DESCRIPTION OF THE DRAWINGS

Figure 1:
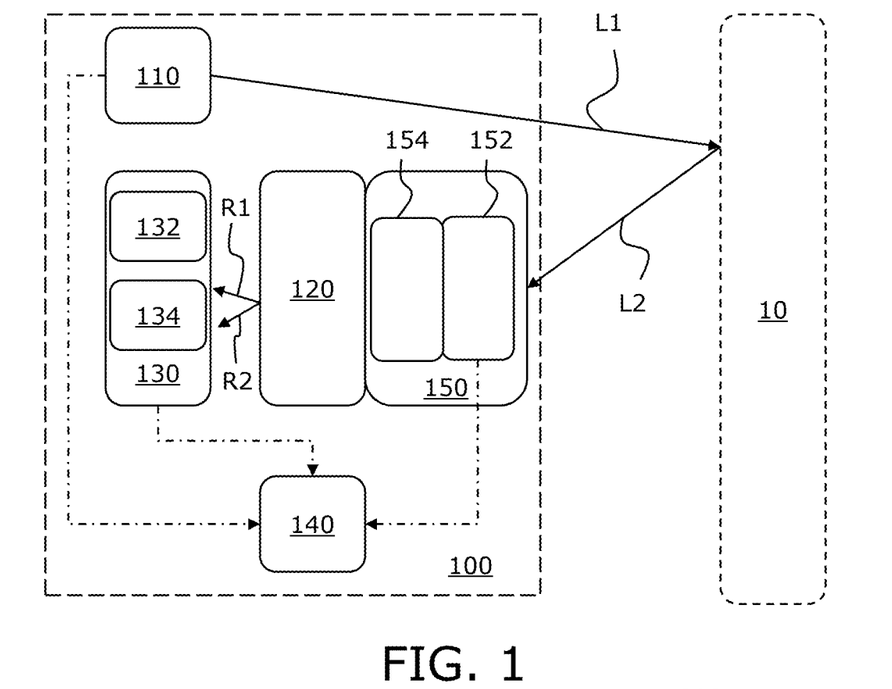
FIG. 1 is an illustration of schematic block diagram of an apparatus for depth sensing, in accordance with embodiments of the present disclosure.

Referring to FIG. 1, illustrated is a schematic block diagram of an apparatus 100 for depth sensing, in accordance with embodiments of the present disclosure. The apparatus 100 includes a scanning light source 110 configured to sequentially illuminate an environment 10 utilizing a scan pattern L1. The apparatus 100 also includes a birefringent layer 120 adapted to receive and split reflected scan pattern L2 from the environment 10 into an ordinary ray (O-ray) image R1 and an extraordinary ray (E-ray) image R2. The apparatus 100 further includes an imaging sensor 130 positioned along an optical path of the birefringent layer 120 to capture the O-ray image R1 and the E-ray image R2 as transmitted therefrom. The apparatus 100 further includes a processor 140 configured to compute differences between positions of the O-ray image R1 and the E-ray image R2 and derive a depth map of the environment 10 based on the computed differences.

In some examples, as illustrated, the apparatus 100 further includes a modulating layer 150 positioned between the scanning light source 110 and the birefringent layer 120. The modulating layer 150 includes a liquid crystal (LC) structure 152 and a linear polarizer 154, being configured to modulate a polarization of the reflected scan pattern L2 to selectively eliminate one of the O-ray image R1 and the E-ray image R2 for transitioning between different operational modes of depth sensing.

In some examples, as illustrated, the imaging sensor 130 includes at least one event camera having a pixel array sensitive to changes in incoming illumination due to the O-ray image R1 and the E-ray image R2. Herein, the at least one event camera comprises a first event camera 132 and a second event camera 134. The processor 140 is configured to capture and triangulate the O-ray image R1 and the E-ray image R2 from the birefringent layer 120 using both the first event camera 132 and the second event camera 134, to achieve stereo depth determination for deriving the depth map of the environment 10.

Figure 2:
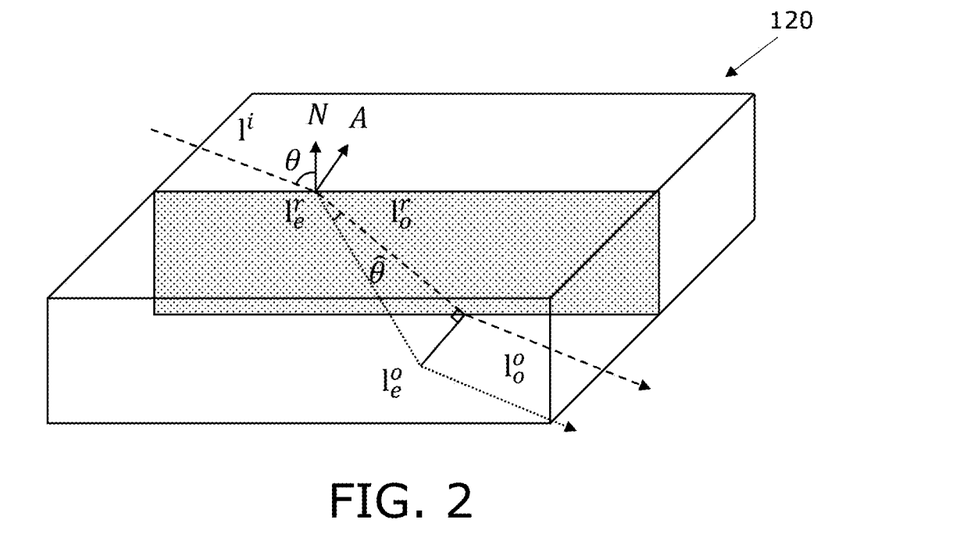
FIG. 2 is an illustration of a schematic of implementation of a birefringent layer of the apparatus, in accordance with embodiments of the present disclosure.

Referring to FIG. 2, illustrated is a schematic of implementation of the birefringent layer 120, in accordance with embodiments of the present disclosure. As illustrated, an incident ray $I^i$ encounters the birefringent layer 120 at an angle $\theta$ with respect to a perpendicular plane N (with reflected ray A) and is split into two components: an ordinary ray $I^r_o$ and an extraordinary ray $I^r_e$. The ordinary ray $I^r_o$ continues in the same plane of incidence, whereas the extraordinary ray $I^r_e$ diverges at an angle $\hat{\theta}$ due to double refraction from the birefringent layer 120. This divergence creates two distinct paths of light within the birefringent layer 120, which, upon exiting, provide two spatially separated images, an ordinary image $I^o_o$ and an extraordinary ray $I^o_e$ used by the apparatus 100 to calculate depth information.

Figure 3:
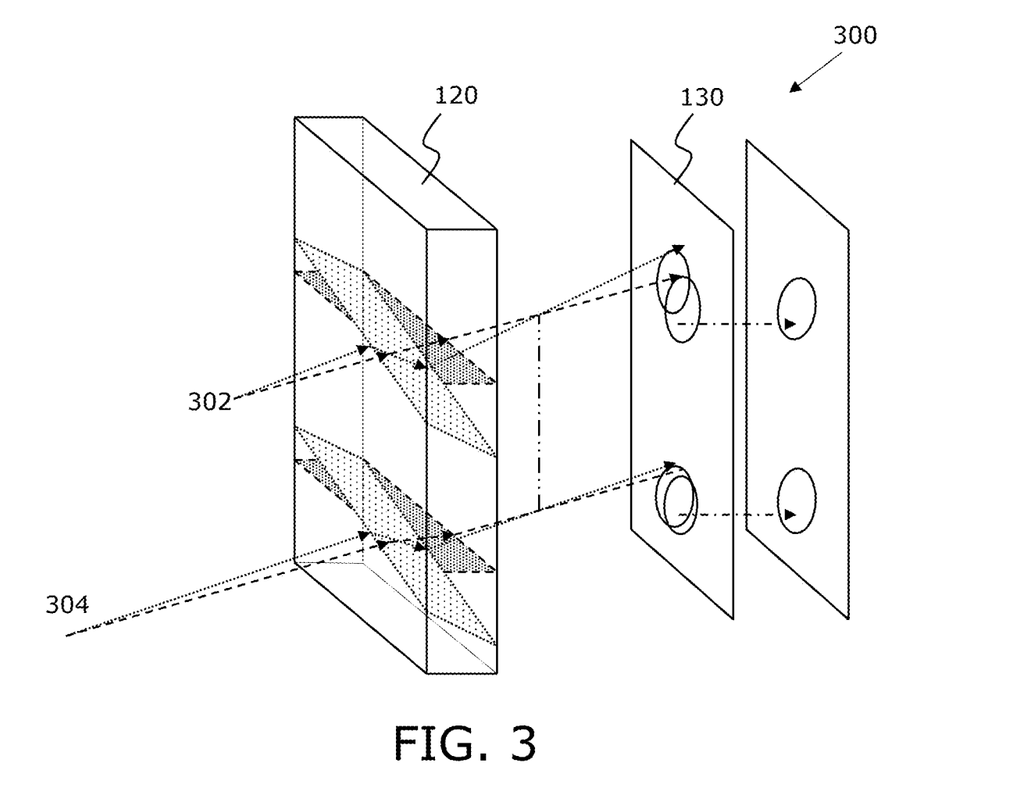
FIG. 3 is an illustration of visual diagram for depth perception of the apparatus, in accordance with embodiments of the present disclosure.

Referring to FIG. 3, illustrated is a visual diagram (referred by reference numeral 300) for depth perception of the apparatus 100 of FIG. 1, in accordance with embodiments of the present disclosure. As illustrated, the birefringent layer 120 creates stereo images by refracting light rays from both a near scene 302 and a far scene 304 within the environment. The diagram 300 depicts that the farther apart the refracted images (O-ray images) are on the imaging sensor 130, the greater the distance from the imaging sensor 130 to the object point in the environment. This separation between the images is used to calculate the depth of various points in the scene, with wider separations indicating points further away from the imaging sensor 130. This correlation between the distance of separation on the imaging sensor 130 and the actual depth in the environment is utilized for depth sensing.

Figure 4A:
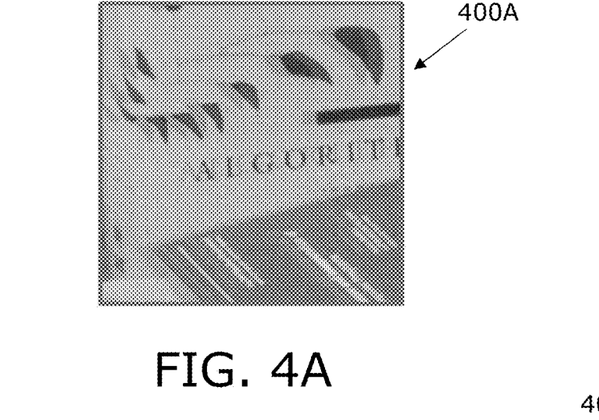
FIGS. 4A-4C are illustrations of visual outputs of the apparatus through various stages of image processing, in accordance with embodiments of the present disclosure.
Figure 4B:
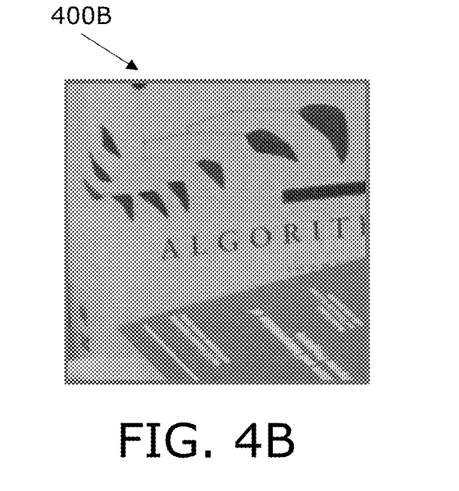
Figure 4C:
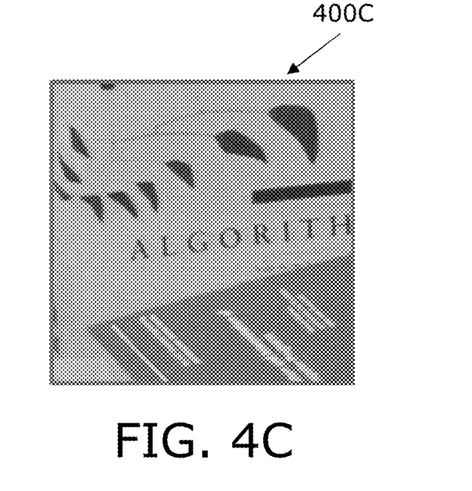

Referring to FIGS. 4A-4C, illustrated are visual outputs of the apparatus 100 through various stages of image processing, in accordance with embodiments of the present disclosure. FIG. 4A depicts the double-refraction input image (referred by reference numeral 400A) as captured by the imaging sensor 130, where both the O-ray and E-ray components are present. FIG. 4B depicts a close-up view of corresponding O-ray image (referred by reference numeral 400B) having a Peak Signal-to-Noise Ratio (PSNR) value of 40.80 dB and a Structural Similarity Index (SSIM) value of 0.99. FIG. 4C depicts a close-up view of corresponding E-ray image (referred by reference numeral 400C) having the PSNR value of 36.90 dB and the SSIM value of 0.98. The PSNR and the SSIM values indicate the quality of the images, with higher PSNR and SSIM values representing better image fidelity.

Figure 5:
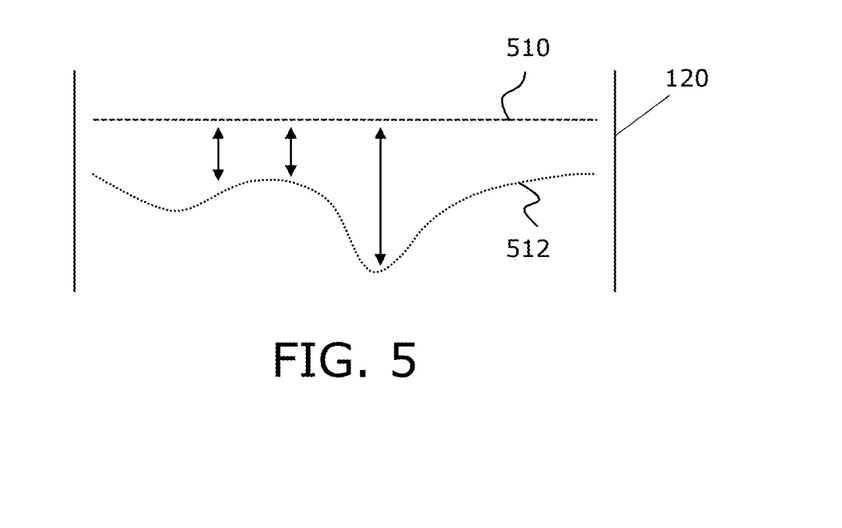
FIG. 5 is an illustration of visual diagram of function of the birefringent layer when a scan pattern is illuminated, in accordance with embodiments of the present disclosure.

Referring to FIG. 5, illustrated is a visual diagram (referred by reference numeral 500) of function of the birefringent layer 120 when a scan pattern is illuminated, in accordance with embodiments of the present disclosure. As illustrated, a single illuminated scan pattern is divided to generate two images: an O-ray image 510 and an E-ray image 512. The path of the E-ray image 512, depicted as diverging from the O-ray image 510, represents effect of the birefringent layer 120 on the scan pattern, emphasizing the angular disparity which is inversely proportional to the optical depth.

In the apparatus 100 of FIG. 1, the scanning light source 100 is configured to pre-curve the scan pattern L1, L2 to complement the curvature of lens of the imaging sensor 130. This pre-curvature is designed to ensure that both the O-ray image R1 and the E-ray image R2 are rendered comparatively linear, thus minimizing the distortion effects commonly introduced by lens curvature.

Figure 6:
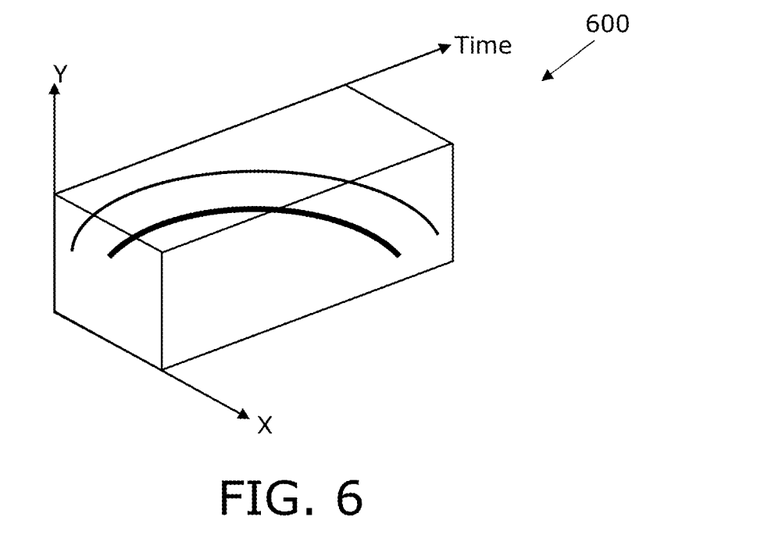
FIG. 6 is an illustration of visual diagram of a three-dimensional representation of the depth mapping process utilizing the birefringent O-S ray, in accordance with embodiments of the present disclosure.

Referring to FIG. 6, illustrated is a visual diagram (referred by reference numeral 600) of a three-dimensional representation of the depth mapping process utilizing the birefringent O-S ray, in accordance with embodiments of the present disclosure. As illustrated, the light, following a pre-determined trajectory through the birefringent material, produces a stereo effect by differentiating the O-ray path and the S-ray path. This differentiation enables the capture of depth information at a higher density along the trajectory of the light rays, providing a detailed depth profile for depth sensing by the apparatus 100 of FIG. 1.

Figure 7:
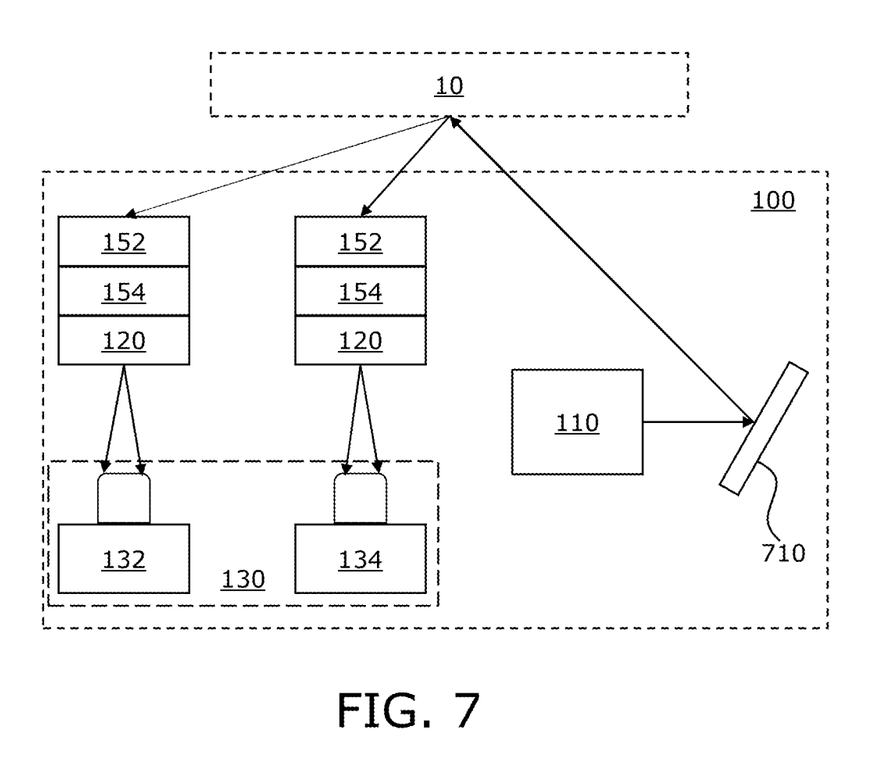
FIG. 7 is an illustration of a schematic diagram of implementation of the apparatus for light conditioning and image capturing, in accordance with embodiments of the present disclosure.

Referring to FIG. 7, in conjunction with FIG. 1, illustrated is a schematic diagram of implementation of the apparatus 100 for light conditioning and image capturing, in accordance with embodiments of the present disclosure. As illustrated, the apparatus 100 includes the scanning light source 110, characterized as a Vertical-Cavity Surface-Emitting Laser (VCSEL) projector, equipped with a laser dot scanner 710. The laser dot scanner 710 is configured for projecting a scan pattern across the environment 10, which is then modulated in width, size, aspect ratio, and shape to suit the depth mapping requirements. The apparatus 100 also includes the liquid crystal (LC) structure 152 and the linear polarizer 154 to modulate a polarization of the reflected scan pattern. The light then interacts with the birefringent layer 120, which splits the incoming light into O-ray and E-ray images, which are captured by the imaging sensor 130 having two event cameras 132, 134. Each of the event cameras 132, 134 includes a pixel array that reacts sensitively to the changes in illumination between the O-ray and E-ray. Subsequently, the processor 140 (as shown in FIG. 1) computes the spatial discrepancies between these rays to construct a comprehensive depth map of the environment.

Figure 8:
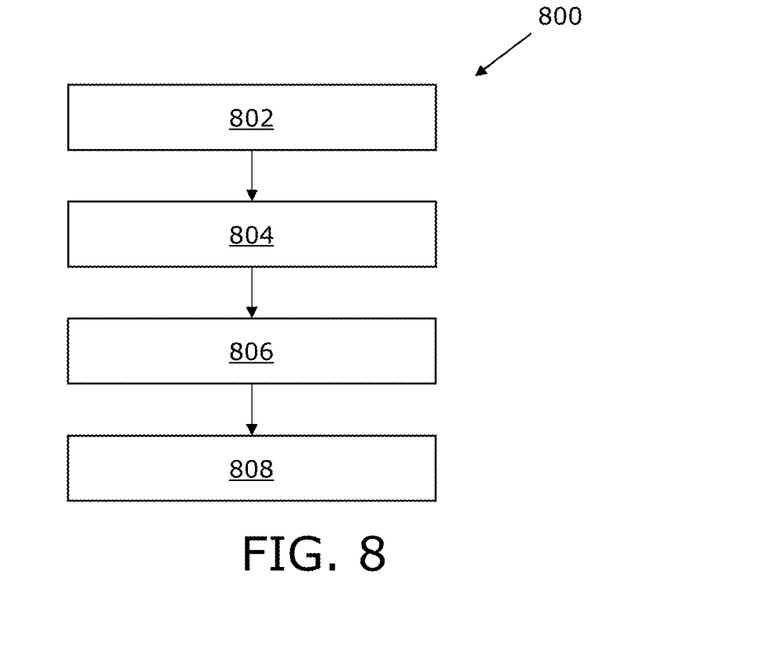
FIG. 8 is an illustration of a flowchart listing steps of a method for depth sensing, in accordance with embodiments of the present disclosure.

Referring to FIG. 8, illustrated is a flowchart listing steps involved in a method 800 for depth sensing, in accordance with embodiments of the present disclosure. The method 800 is implemented by the apparatus 100. At step 802, the method 800 includes sequentially illuminating an environment using a scanning light source utilizing a scan pattern. At step 804, the method 800 includes receiving and splitting reflected scan pattern from the environment into an ordinary ray (O-ray) image and an extraordinary ray (E-ray) image using a birefringent layer. At step 806, the method 800 includes capturing the O-ray image and the E-ray image along an optical path of the birefringent layer using an imaging sensor. At step 808, the method 800 includes computing differences between positions of the O-ray image and the E-ray image and deriving a depth map of the environment based on the computed differences.

The aforementioned steps are only illustrative, and other alternatives can also be provided where one or more steps are added, one or more steps are removed, or one or more steps are provided in a different sequence without departing from the scope of the claims herein.

The invention claimed is:

1. An apparatus for depth sensing, the apparatus comprising:
a scanning light source configured to sequentially illuminate an environment utilizing a scan pattern;
a birefringent layer adapted to receive and split reflected scan pattern from the environment into an ordinary ray (O-ray) image and an extraordinary ray (E-ray) image;
an imaging sensor positioned along an optical path of the birefringent layer to capture the O-ray image and the E-ray image as transmitted therefrom; and
a processor configured to compute differences between positions of the O-ray image and the E-ray image and derive a depth map of the environment based on the computed differences,
wherein the scanning light source is configured to pre-curve the scan pattern to match a curvature of a lens of the imaging sensor, such that the O-ray image and the E-ray image are comparatively linear, minimizing lens distortion effects.

2. The apparatus of claim 1, wherein the scanning light source comprises a Vertical-Cavity Surface-Emitting Laser (VCSEL) projector having a laser dot scanner configured for the sequential illumination of the environment by moving a laser dot across the environment, to generate the scan pattern in form of a line or a curve.

3. The apparatus of claim 2, wherein the scanning light source is configured to adjust one or more of width, size, aspect ratio, shape of the laser dot.

4. An apparatus for depth sensing, the apparatus comprising:
a scanning light source configured to sequentially illuminate an environment utilizing a scan pattern;
a birefringent layer adapted to receive and split reflected scan pattern from the environment into an ordinary ray (O-ray) image and an extraordinary ray (E-ray) image;
an imaging sensor positioned along an optical path of the birefringent layer to capture the O-ray image and the E-ray image as transmitted therefrom; and
a processor configured to compute differences between positions of the O-ray image and the E-ray image and derive a depth map of the environment based on the computed differences,
wherein the imaging sensor comprises at least one event camera having a pixel array sensitive to changes in incoming illumination due to the O-ray image and the E-ray image, and wherein the processor is configured to compute the differences between the positions of the O-ray image and the E-ray image across the pixel array in the at least one event camera.

5. An apparatus for depth sensing, the apparatus comprising:
a scanning light source configured to sequentially illuminate an environment utilizing a scan pattern;
a birefringent layer adapted to receive and split reflected scan pattern from the environment into an ordinary ray (O-ray) image and an extraordinary ray (E-ray) image;
an imaging sensor positioned along an optical path of the birefringent layer to capture the O-ray image and the E-ray image as transmitted therefrom; and
a processor configured to compute differences between positions of the O-ray image and the E-ray image and derive a depth map of the environment based on the computed differences,
wherein the processor is further configured to resolve overlapping pixel events, in processing of the E-ray image, by tracing origin of each pixel event corresponding to the E-ray image along a curvature of the lens of the imaging sensor.

6. An apparatus for depth sensing, the apparatus comprising:
a scanning light source configured to sequentially illuminate an environment utilizing a scan pattern;
a birefringent layer adapted to receive and split reflected scan pattern from the environment into an ordinary ray (O-ray) image and an extraordinary ray (E-ray) image;

an imaging sensor positioned along an optical path of the birefringent layer to capture the O-ray image and the E-ray image as transmitted therefrom; and a processor configured to compute differences between positions of the O-ray image and the E-ray image and derive a depth map of the environment based on the computed differences, wherein the imaging sensor is adapted to be sensitive to variations in light intensity to distinguish between overlapping pixel events corresponding to E-ray image by detecting an increased light intensity arising from two coinciding E-ray images.

7. An apparatus for depth sensing, the apparatus comprising:

a scanning light source configured to sequentially illuminate an environment utilizing a scan pattern;

a birefringent layer adapted to receive and split reflected scan pattern from the environment into an ordinary ray (O-ray) image and an extraordinary ray (E-ray) image;

an imaging sensor positioned along an optical path of the birefringent layer to capture the O-ray image and the E-ray image as transmitted therefrom;

a processor configured to compute differences between positions of the O-ray image and the E-ray image and derive a depth map of the environment based on the computed differences; and a modulating layer positioned between the scanning light source and the birefringent layer, the modulating layer, comprising a liquid crystal (LC) structure and a linear polarizer, being configured to modulate a polarization of the reflected scan pattern to selectively eliminate one of the O-ray image and the E-ray image for transitioning between different operational modes of depth sensing.

8. An apparatus for depth sensing, the apparatus comprising:

a scanning light source configured to sequentially illuminate an environment utilizing a scan pattern;

a birefringent layer adapted to receive and split reflected scan pattern from the environment into an ordinary ray (O-ray) image and an extraordinary ray (E-ray) image;

an imaging sensor positioned along an optical path of the birefringent layer to capture the O-ray image and the E-ray image as transmitted therefrom; and a processor configured to compute differences between positions of the O-ray image and the E-ray image and derive a depth map of the environment based on the computed differences, wherein the imaging sensor comprises at least one event camera having a pixel array sensitive to changes in incoming illumination due to the O-ray image and the E-ray image, and wherein the processor is configured to compute the differences between the positions of the O-ray image and the E-ray image across the pixel array in the at least one event camera, and wherein the at least one event camera comprises a first event camera and a second event camera, and wherein the processor is configured to capture and triangulate the O-ray image and the E-ray image from the birefringent layer using both the first event camera and the second event camera, to achieve stereo depth determination for deriving the depth map of the environment.

9. An apparatus for depth sensing, the apparatus comprising:

a scanning light source configured to sequentially illuminate an environment utilizing a scan pattern;

a birefringent layer adapted to receive and split reflected scan pattern from the environment into an ordinary ray (O-ray) image and an extraordinary ray (E-ray) image;

an imaging sensor positioned along an optical path of the birefringent layer to capture the O-ray image and the E-ray image as transmitted therefrom; and a processor configured to compute differences between positions of the O-ray image and the E-ray image and derive a depth map of the environment based on the computed differences, wherein the processor is further configured to:
control the scanning light source to generate two distinct scan patterns,
discern optical projections corresponding to the O-ray image and the E-ray image based on the two distinct scan patterns, and
analyze the relative spatial positioning of the optical projections for deriving the depth map of the environment, utilizing stereo matching techniques.

10. A method for depth sensing, the method comprising:
sequentially illuminating an environment using a scanning light source utilizing a scan pattern;
receiving and splitting reflected scan pattern from the environment into an ordinary ray (O-ray) image and an extraordinary ray (E-ray) image using a birefringent layer;
capturing the O-ray image and the E-ray image along an optical path of the birefringent layer using an imaging sensor;
computing differences between positions of the O-ray image and the E-ray image and deriving a depth map of the environment based on the computed differences; and
pre-curving the scan pattern to match a curvature of a lens of the imaging sensor, such that the O-ray image and the E-ray image are comparatively linear, minimizing lens distortion effects.

11. The method according to claim 10, wherein the scanning light source comprises a Vertical-Cavity Surface-Emitting Laser (VCSEL) projector providing a laser dot, and wherein the method comprises: moving the laser dot across the environment for sequential illumination; and adjusting one or more of the width, size, aspect ratio, and shape of the laser dot using the scanning light source.

12. A method for depth sensing, the method comprising:
sequentially illuminating an environment using a scanning light source utilizing a scan pattern;
receiving and splitting reflected scan pattern from the environment into an ordinary ray (O-ray) image and an extraordinary ray (E-ray) image using a birefringent layer;
capturing the O-ray image and the E-ray image along an optical path of the birefringent layer using an imaging sensor;
computing differences between positions of the O-ray image and the E-ray image and deriving a depth map of the environment based on the computed differences; and
resolving overlapping pixel events in the processing of the E-ray image by tracing origin of each pixel event corresponding to the E-ray image along a curvature of the lens of the imaging sensor.

13. A method for depth sensing, the method comprising:
sequentially illuminating an environment using a scanning light source utilizing a scan pattern;

receiving and splitting reflected scan pattern from the environment into an ordinary ray (O-ray) image and an extraordinary ray (E-ray) image using a birefringent layer;

capturing the O-ray image and the E-ray image along an optical path of the birefringent layer using an imaging sensor;

computing differences between positions of the O-ray image and the E-ray image and deriving a depth map of the environment based on the computed differences; and distinguishing between overlapping pixel events corresponding to E-ray image by detecting an increased light intensity arising from two coinciding E-ray images using an imaging sensor adapted to be sensitive to variations in light intensity.

* * * * *